United States Patent
Fujisawa et al.

[11] Patent Number: 6,097,228
[45] Date of Patent: Aug. 1, 2000

[54] RESET INPUT CIRCUIT FOR AN MCU

[75] Inventors: Isao Fujisawa, Yokohama; Yoshikazu Nagashima, Funabashi; Nobutaka Kitagawa, Kawasaki, all of Japan

[73] Assignee: Kabushiki Kaisha Toshiba

[21] Appl. No.: 09/120,115

[22] Filed: Jul. 22, 1998

[30] Foreign Application Priority Data

Jul. 24, 1997 [JP] Japan ..................................... 9-198395

[51] Int. Cl.$^7$ ...................................................... H03K 3/02
[52] U.S. Cl. ........................... 327/198; 327/142; 327/291
[58] Field of Search ..................................... 327/172–175, 327/176, 291, 298, 105, 107, 113, 114, 115–117, 198, 142, 143, 141; 365/233

[56] References Cited

U.S. PATENT DOCUMENTS 4,354,747  10/1982  Borowski et al. ...................... 396/302
5,721,501   2/1998  Toyoda et al. ............................ 327/116

FOREIGN PATENT DOCUMENTS 8-7584   1/1996  Japan .
9-55092  2/1997  Japan .
9-146852 6/1997  Japan .

*Primary Examiner*—Timothy P. Callahan
*Assistant Examiner*—Minh Nguyen
*Attorney, Agent, or Firm*—Finnegan, Henderson, Farabow, Garrett & Dunner, L.L.P.

[57] ABSTRACT

A semiconductor integrated circuit device includes an MCU, reset circuit and reset input circuit. The reset circuit resets the MCU in response to a reset signal input to a reset terminal. The reset input circuit eliminates an electromagnetic disturbance noise input to the reset terminal, permits only a signal having an effective pulse width to pass therethrough, forms an internal reset signal of a pulse width required for the reset operation according to the signal, and supplies the same to the reset circuit. The reset input circuit includes an analog delay circuit, delay latch group, effective pulse width detection circuit and waveform forming circuit. The analog delay circuit eliminates a noise of a period shorter than the effective pulse width from the reset signal. The delay latch group sequentially samples an output signal of the analog delay circuit. The effective pulse width detection circuit determines whether or not the reset signal has an effective pulse width in response to an output signal of the delay latch group. The waveform forming circuit receives an output signal of the effective pulse width detection circuit, and when it is detected that the reset signal has the effective pulse width, it forms an internal reset signal having a necessary pulse width from the reset signal.

17 Claims, 6 Drawing Sheets

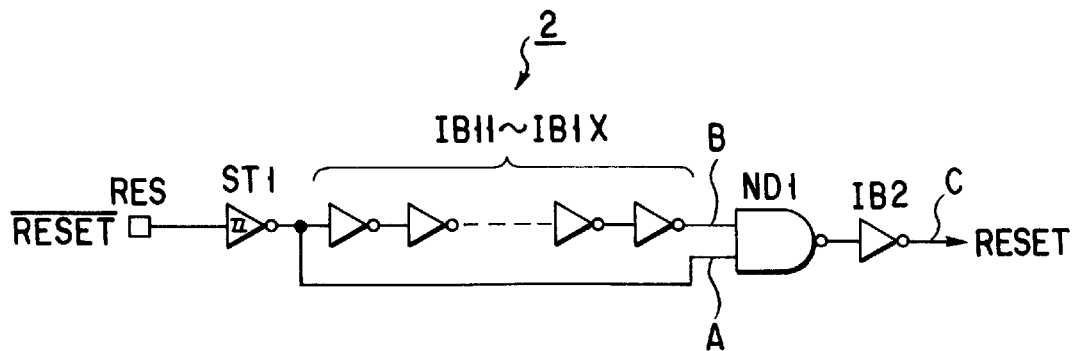
F I G. 3
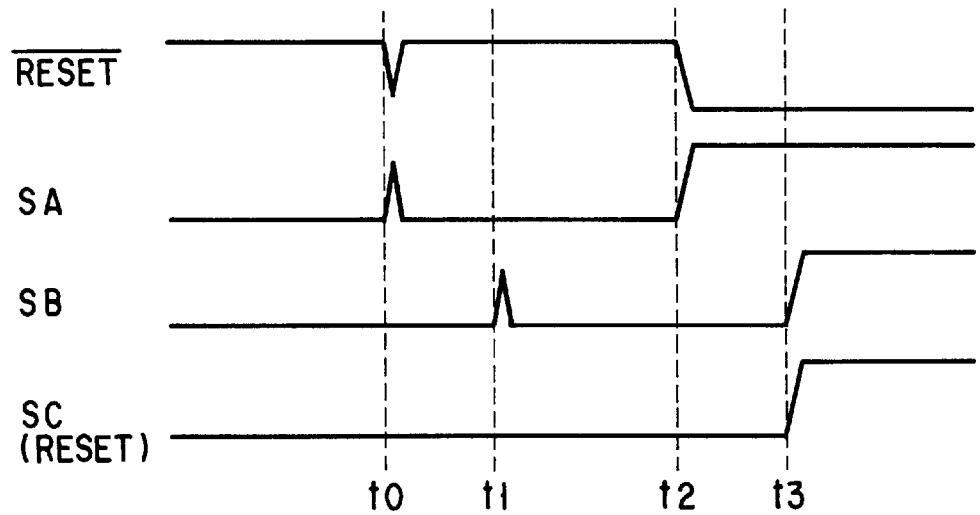
F I G. 4
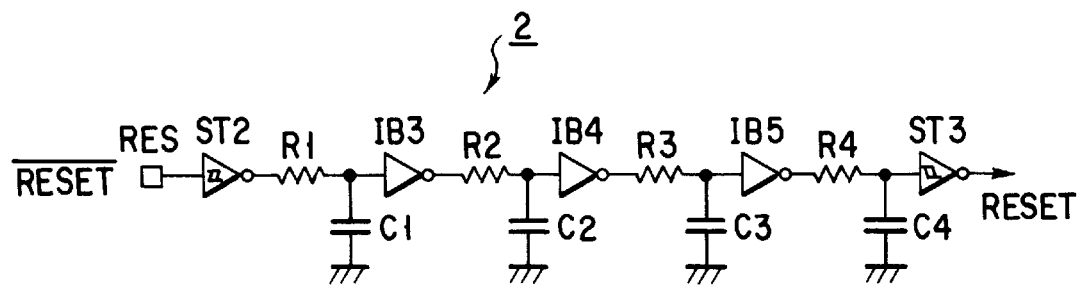
F I G. 5

| CONTROL SIGNAL / DELAY TIME | SEL1 | SEL2 | SEL3 | SEL4 |
|---|---|---|---|---|
| 50ns | H | L | L | L |
| 100ns | L | H | L | L |
| 200ns | L | L | H | L |
| 500ns | L | L | L | H |

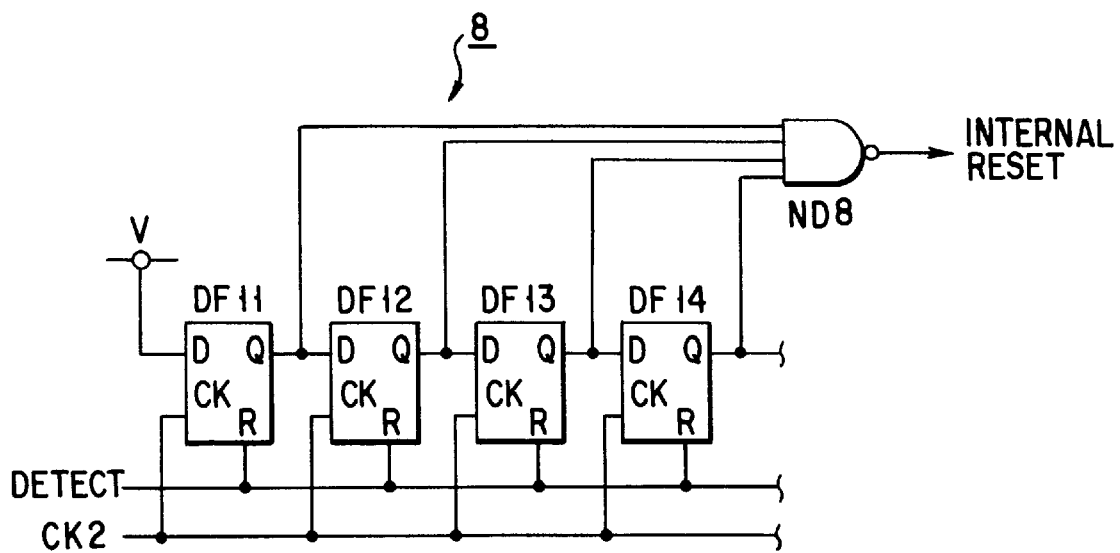
F I G. 11
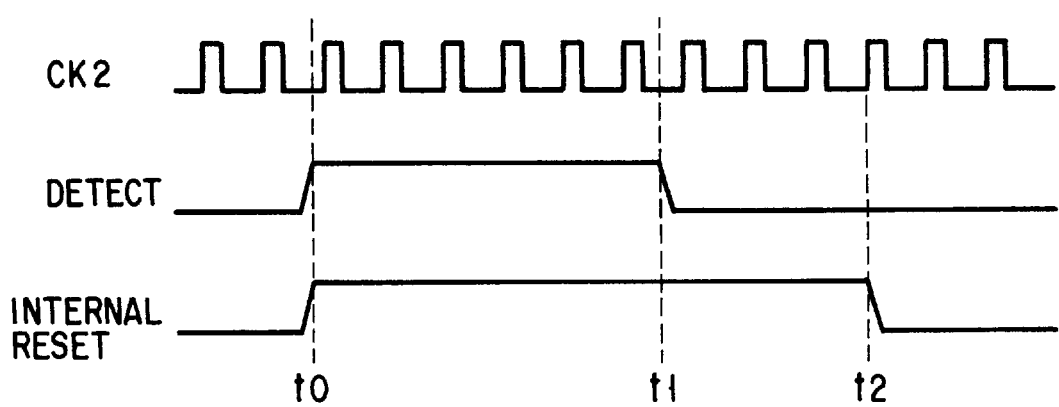
F I G. 12

6,097,228

1

RESET INPUT CIRCUIT FOR AN MCU

BACKGROUND OF THE INVENTION

This invention relates to a semiconductor integrated circuit device having an MCU (micro controller unit) and more particularly to the technique for reducing the possibility of the erroneous operation of an MCU due to introduction of electromagnetic disturbance noise to a reset terminal, test terminal, mode switching terminal, interruption terminal and the like.

A reset circuit for initializing the operation of an MCU is contained in the semiconductor integrated circuit device having the MCU and a reset terminal for inputting a reset signal used for specifying the initialization is formed on the reset circuit. Further, a test terminal for inputting a test signal to effect the test operation, a mode switching terminal for inputting a mode switching signal to switch the operation mode, and an interruption terminal for inputting an interruption signal to effect the interruption process and the like are provided.

However, a noise from the exterior, for example, noise from an actuator is introduced into the reset terminal, test terminal, mode switching terminal, interruption terminal and the like so as to cause the erroneous operation and runaway of the MCU. As a countermeasure for noises in the semiconductor integrated circuit device having the MCU, conventionally, a noise filter circuit as shown in FIG. 1 is provided between the reset terminal and the reset circuit, for example, to eliminate the noise.

The noise filter circuit shown in FIG. 1 includes an inverter IB100, delay circuit DL100 and NAND gate ND100. A reset signal RESET input to the reset terminal RES is supplied to and inverted by the inverter IB100, then the output signal of the inverter IB100 is input to the first input terminal of the NAND gate ND100 and input to the second input terminal of the NAND gate ND100 after it is delayed by the delay circuit DL100. Then, the reset signal RESET is output from the NAND gate ND100 and supplied to the reset circuit for initializing the MCU.

The noise filter circuit eliminates an impulsive noise shorter than the delay time of the delay circuit DL100 among the noises introduced into the reset terminal RES so as to prevent the noise from being introduced into the reset circuit.

However, in the noise filter circuit with the construction shown in FIG. 1, only an impulsive noise having a pulse width shorter than the delay time of the delay circuit DL100 can be eliminated. For this reason, a noise having a pulse width longer than the delay time will pass through the circuit and is input to the next-stage reset circuit. Therefore, if the noise is longer than the delay time of the delay circuit DL100 and shorter than time which is sufficiently long for causing the reset circuit to correctly function, it becomes impossible to initialize the MCU and the noise may cause the erroneous operation and runaway of the MPU.

The problem of the erroneous operation and runaway of the MCU due to the electromagnetic disturbance noise may occur not only in the reset terminal but also in the other terminal such as the test terminal, mode switching terminal and interruption terminal.

BRIEF SUMMARY OF THE INVENTION

Accordingly, an object of this invention is to provide a semiconductor integrated circuit device capable of effectively eliminating noises, extracting a signal with an effec-

2 tive pulse width and forming a stable internal signal with a necessary pulse width.

The above object can be attained by a semiconductor integrated circuit device comprising a noise filter circuit for eliminating a noise with a pulse width shorter than an effective pulse width from an input signal; a sampling circuit for sequentially sampling an output signal of the noise filter circuit; an effective pulse width detection circuit for receiving an output signal of the sampling circuit and determining whether or not the input signal has an effective pulse width; and a waveform forming circuit for receiving an output signal of the effective pulse width detection circuit and forming an internal signal with a necessary pulse width based on the input signal when it is detected that the input signal has an effective pulse width.

With the above construction, the noise having a pulse width shorter than the effective pulse width is eliminated from the input signal by the noise filter, whether or not the signal sampled by the sampling circuit has an effective pulse width is determined by the effective pulse width detection circuit, and the internal signal having the necessary pulse width is formed based on the input signal by the waveform forming circuit when it is detected that the signal has an effective pulse width so that impulsive noise can be effectively eliminated, an input signal with an effective pulse width can be extracted and a stable internal signal with a necessary pulse width can be formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a circuit diagram showing an example of the construction of an analog delay circuit in the circuit of FIG. 2;

FIG. 4 is a timing chart for illustrating the operation of the analog delay circuit shown in FIG. 3;

FIG. 5 is a circuit diagram showing a CR filter circuit, for illustrating another example of the construction of the analog delay circuit in the circuit of FIG. 2;

FIG. 11 is a circuit diagram showing an example of the construction of a waveform forming circuit in the circuit of FIG. 2; and FIG. 12 is a timing chart for illustrating the operation of the waveform forming circuit shown in FIG. 11.

DETAILED DESCRIPTION OF THE INVENTION

Figure 1:
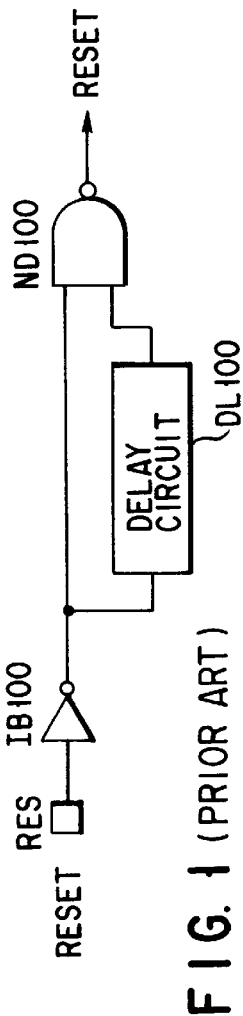
FIG. 1 is a circuit diagram showing a noise filter circuit, for illustrating a conventional semiconductor integrated circuit device having an MCU.
Figure 2:
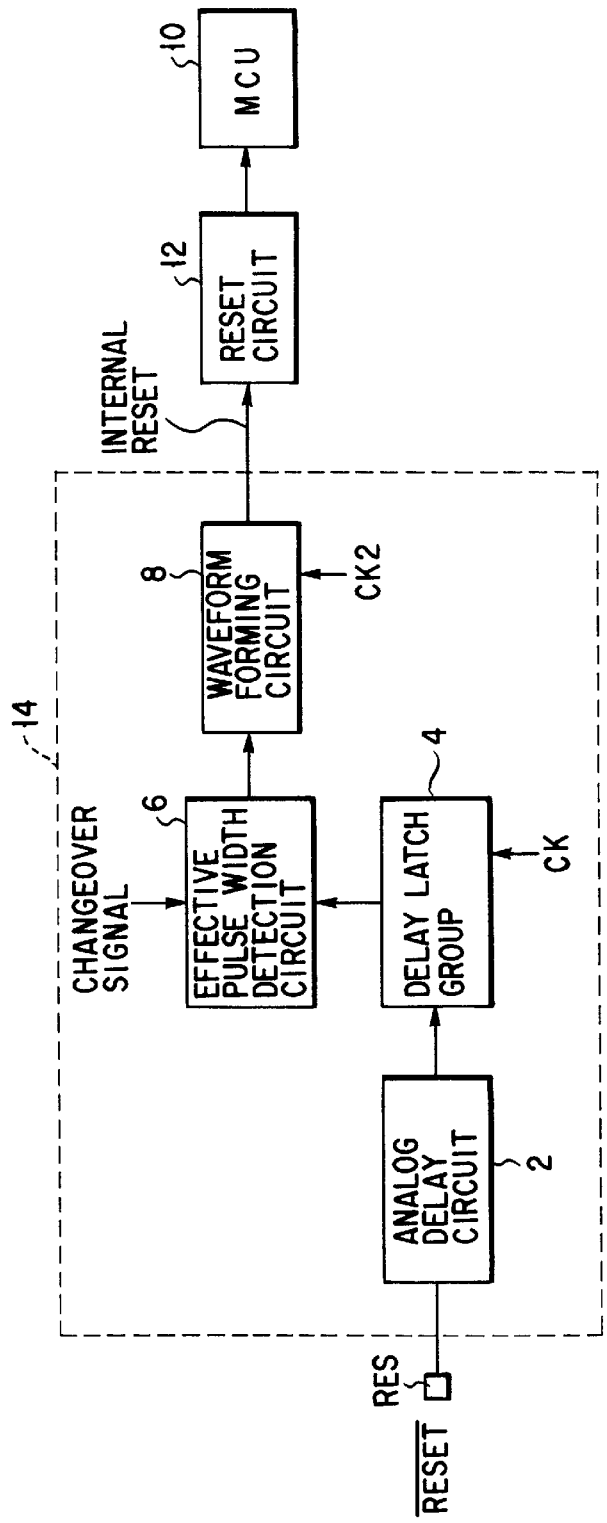
FIG. 2 is a block diagram showing a main portion extracted for illustrating a semiconductor integrated circuit device according to an embodiment of this invention.

FIG. 2 is a block diagram showing a main portion extracted for illustrating a semiconductor integrated circuit device according to an embodiment of this invention. The semiconductor integrated circuit device includes an MCU (micro controller unit) 10, reset circuit 12, reset input circuit 14 and reset terminal RES. The reset circuit 12 is to reset the MCU 10 in response to a reset signal $\overline{\text{RESET}}$ input to the reset terminal RES. The reset input circuit 14 is provided between the reset terminal RES and the input terminal of the reset circuit 12 and has a function of eliminating an electromagnetic disturbance noise input to the reset terminal RES from the exterior, for example, noises from the actuator, permitting only a signal with the effective pulse width to pass therethrough, forming an internal reset signal RESET of a pulse width required for the reset operation based on the above signal and supplying the same to the reset circuit 12. The reset input circuit 14 includes an analog delay circuit 2, delay latch group 4, effective pulse width detection circuit 6 and waveform forming circuit 8.

The reset terminal RES is supplied with the reset signal $\overline{\text{RESET}}$ for specifying the reset operation of the MCU 10 from the exterior. The reset terminal RES is connected to the input terminal of the analog delay circuit 2 for eliminating impulsive (whisker shaped) noises. The output terminal of the analog delay circuit 2 is connected to the input terminal of the delay latch group 4 for sequentially sampling the reset signal to determine whether or not the reset signal $\overline{\text{RESET}}$ has an effective pulse width. The delay latch group 4 is constructed by a shift register, for example, and sequentially transfers data sampled in response to a clock signal CK. The output terminal of the delay latch group 4 is connected to the input terminal of the effective pulse detection circuit 6 for determining whether or not the reset signal $\overline{\text{RESET}}$ has an effective pulse width. The effective pulse width detection circuit 6 is supplied with a changeover signal for changing the effective pulse width of the reset signal $\overline{\text{RESET}}$ from the exterior. The output terminal of the effective pulse detection circuit 6 is connected to the input terminal of the waveform forming circuit 8 for determining the result of the output of the effective pulse detection circuit 6 and forming a signal with a pulse width necessary for the reset operation of the MCU 10 by the reset circuit 12. The waveform forming circuit 8 is supplied with a clock signal CK2 from the exterior. Then, an internal reset signal RESET having such a pulse width as to unfailingly effect the reset operation is output from the waveform forming circuit 8 to the reset circuit 12.

The reset input circuit 14 effects the following circuit operation. First, an impulsive noise having a pulse width shorter than a preset pulse width (effective pulse width) is eliminated from the reset signal $\overline{\text{RESET}}$ input to the reset terminal RES by the analog delay circuit 2 and (then the) obtained signal is supplied to the delay latch group 4 as a reset signal RESET. The reset signal RESET input to the delay latch group 4 is sequentially shifted in response to the clock signal CK and held in the delay latch circuit 4 so as to determine whether or not the signal has an effective pulse width for specifying the reset operation. Then, whether or not the pulse width of the signal is the effective pulse width is determined by the effective pulse width detection circuit 6 based on data sampled in the delay latch group 4. If a noise is introduced into the reset terminal RES during the sampling operation in the delay latch group 4, data sampled into the delay latch group 4 is initialized and the delay latch group 4 is set into the non-holding state again so that the operation for detecting the effective pulse width which contains the sampling operation and constant monitoring operation can be effected. The effective pulse width can be changed according to a changeover signal input from the exterior to the effective pulse width detection circuit 6. If it is determined by the effective pulse detection circuit 6 that the input signal has the effective pulse width, a signal with a pulse width necessary for the reset operation of the MCU 10 by the reset circuit 12 is formed by the waveform forming circuit 8 and output to the reset circuit 12 as an internal reset signal RESET.

FIG. 3 shows an example of the construction of the analog delay circuit 2 shown in FIG. 2. As shown in FIG. 3, the analog delay circuit 2 includes a Schmitt trigger circuit ST1, inverters IB11 to IB1X, NAND gate ND1 and inverter IB2. The reset terminal RES is connected to the input terminal of the Schmitt trigger circuit ST1. The output terminal of the Schmitt trigger circuit ST1 is connected to the first input terminal of the NAND gate ND1 via a plurality of (X) cascade-connected inverters IB11 to IB1X and directly connected to the second input terminal of the NAND gate ND1. The output terminal of the NAND gate ND1 is connected to the input terminal of the delay latch group 4 via the inverter IB2.

Next, the operation of the analog delay circuit 2 shown in FIG. 3 is explained. FIG. 4 is a timing chart for illustrating the circuit operation of the analog delay circuit 2. A signal SA indicates a signal which has passed though the Schmitt trigger circuit ST1 and is supplied to a node A, a signal SB indicates a signal which has passed though the inverter IB1X and is supplied to a node B, and a signal SC indicates a signal (reset signal RESET) which has passed though the inverter IB2 and is supplied to a node C.

As shown in the timing chart of FIG. 4, a noise superposed on the reset signal $\overline{\text{RESET}}$ (at time t0) simultaneously appears on the second input terminal of the NAND gate ND1 and appears on the first input terminal of the NAND gate ND1 at time t1 delayed by the delay time due to the inverters IB11 to IB1X. At this time, since the potentials of the first and second input terminals of the NAND gate ND1 are not simultaneously set at the "H" level, the signal SC, that is, the reset signal RESET maintains the "L" level. Thus, the noise input to the reset terminal RES at the time t0 is eliminated. When the reset signal $\overline{\text{RESET}}$ is set to the "L" level at time t2, the signal SA is set to the "H" level and the signal SB is set to the "H" level at time t3 with the delay time due to the inverters IB11 to IB1X. As a result, since the potentials of the first and second input terminals of the NAND gate ND1 are both set at the "H" level, the signal SC (reset signal RESET) is set to the "H" level. Thus, the circuit shown in FIG. 3 eliminates the impulsive noise superposed on the reset signal $\overline{\text{RESET}}$ and having a period shorter than the delay time due to the inverters IB11 to IB1X.

FIG. 5 shows another example of the construction of the analog delay circuit 2. The circuit shown in FIG. 5 is a CR filter circuit including Schmitt trigger circuits ST2, ST3, resistors R1 to R4, capacitors C1 to C4, and inverters IB3, IB4, IB5. The reset terminal RES is connected to the input terminal of the Schmitt trigger circuit ST2 and the output terminal of the Schmitt trigger circuit ST2 is connected to one end of the resistor R1. The other end of the resistor R1 is connected to the input terminal of the inverter IB3 and the capacitor C1 is connected between the other end of the resistor R1 and the ground node (reference potential node). The output terminal of the inverter IB3 is connected to one end of the resistor R2. The other end of the resistor R2 is connected to the input terminal of the inverter IB4 and the capacitor C2 is connected between the other end of the resistor R2 and the ground node. Further, the output terminal of the inverter IB4 is connected to one end of the resistor R3. The other end of the resistor R3 is connected to the input terminal of the inverter IB5 and the capacitor C3 is connected between the other end of the resistor R3 and the ground node. Further, the output terminal of the inverter IB5 is connected to one end of the resistor R4. The other end of the resistor R4 is connected to the input terminal of the Schmitt trigger circuit ST3 and the capacitor C4 is connected between the other end of the resistor R4 and the ground node. A reset signal RESET output from the output terminal of the Schmitt trigger circuit ST3 is supplied to the delay latch group 4.

Like the analog delay circuit 2 with the construction shown in FIG. 3, in the CR filter circuit with the above construction, an impulsive noise superposed on the reset signal $\overline{\text{RESET}}$ can be eliminated.

Figure 6:
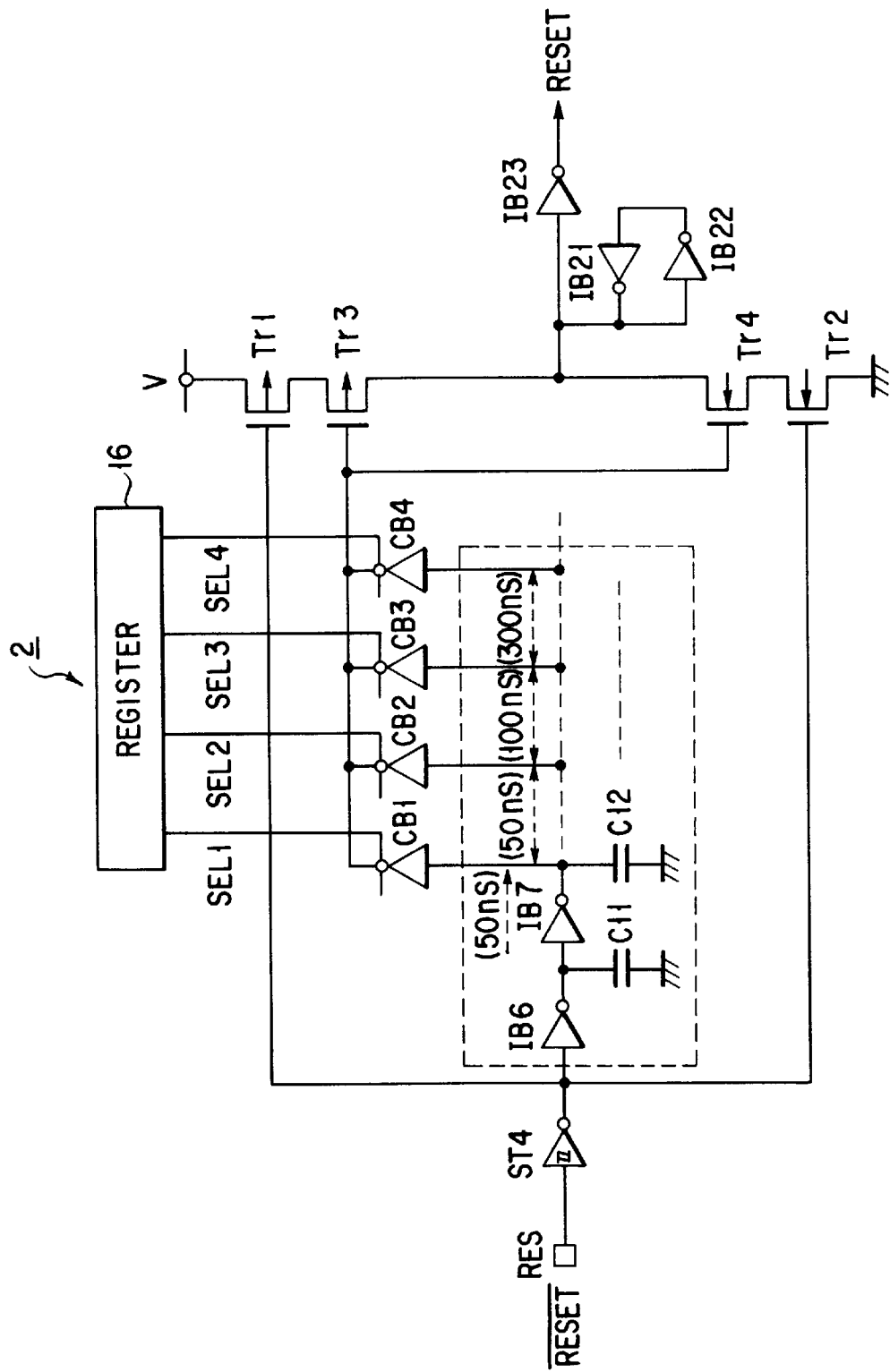
FIG. 6 is a circuit diagram showing a CR filter circuit in which the pulse width of impulsive noise to be eliminated can be changed, for illustrating still another example of the construction of the analog delay circuit in the circuit of FIG. 2.

FIG. 6 shows still another example of the construction of the analog delay circuit 2 shown in FIG. 2. The circuit shown in FIG. 6 includes a Schmitt trigger circuit ST4, inverters IB6, IB7, . . . , capacitors C11, C12, . . . , clocked inverters CB1 to CB4, register 16, P-channel MOS transistors Tr1, Tr3, N-channel MOS transistors Tr2, Tr4, and inverters IB21, IB22, IB23.

The reset terminal RES is connected to the input terminal of the Schmitt trigger circuit ST4 and the output terminal of the Schmitt trigger circuit ST4 is connected to the cascade-connected inverters IB6, IB7, . . . The capacitors C11, C12, . . . are connected between the output terminals of the respective inverters IB6, IB7, . . . and the ground node. Current limiting resistors may be connected between the inverters IB6, IB7, . . . as required.

Further, the input terminal of the clocked inverter CB1 is connected to a point between the inverters IB6, IB7, . . . at which the reset signal $\overline{\text{RESET}}$ input to the reset terminal RES is delayed by 50 ns, the input terminal of the clocked inverter CB2 is connected to a point at which the reset signal $\overline{\text{RESET}}$ is delayed by 50 ns with respect to the connection point of the clocked inverter CB1, the input terminal of the clocked inverter CB3 is connected to a point at which the reset signal $\overline{\text{RESET}}$ is delayed by 100 ns with respect to the connection point of the clocked inverter CB2, and the input terminal of the clocked inverter CB4 is connected to a point at which the reset signal $\overline{\text{RESET}}$ is delayed by 300 ns with respect to the connection point of the clocked inverter CB3. The clock input terminals of the clocked inverters CB1 to CB4 are connected to the output terminals of the register 16. The register 16 functions to set the period in which the impulsive noise is eliminated and output signals SEL1 to SEL4 to control the operations of the clocked inverters CB1 to CB4.

Further, the gates of the MOS transistors Tr1, Tr2 are connected to the connection node of the Schmitt trigger circuit ST4 and the inverter IB6. The output terminals of the clocked inverters CB1 to CB4 are connected to the gates of the MOS transistors Tr3, Tr4. The current paths of the MOS transistors Tr1, Tr2, Tr3, Tr4 are serially connected between a power supply V and the ground node. The output terminal of the inverter IB21 and the input terminals of the inverters IB22 and IB23 are connected to the connection node of the current paths of the MOS transistors Tr3 and Tr4. The output terminal of the inverter IB22 is connected to the input terminal of the inverter IB21 and the inverters IB21, IB22 constitute a latch circuit. A reset signal RESET is output from the output terminal of the inverter IB23.

Figures 7, 8:
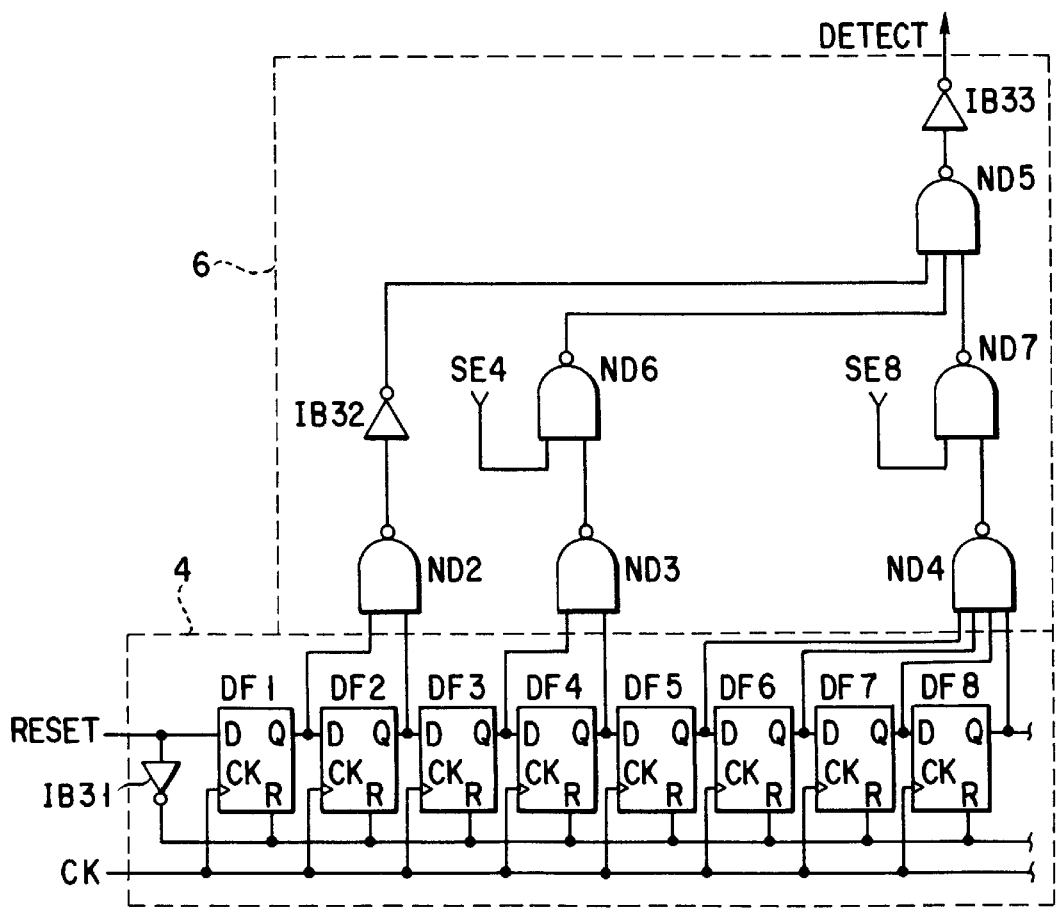
FIG. 7 is a diagram showing the relation between a control signal output from a clocked inverter in the circuit of FIG. 6 and delay time.
FIG. 8 is a circuit diagram showing an example of the construction of an effective pulse width detection circuit and delay latch group in the circuit of FIG. 2.

With the above construction, the delay time of the reset signal RESET input to the reset terminal RES can be selected from 50 ns, 100 ns, 200 ns and 500 ns by selectively setting the levels of the signals SEL1 to SEL4 output from the register 16 as shown in FIG. 7 and controlling outputs of the clocked inverters CB1 to CB4. By effecting the above operation, the pulse width of an impulsive noise to be eliminated can be changed. Further, if the clocked inverters CB1 to CB4 are connected to provide times different from the above times, the delay time of the reset signal RESET can be freely set.

The analog circuit 2 is basically a noise filter circuit for eliminating an impulsive noise and is not limited to the circuit constructions as shown in FIGS. 3, 5 and 6 if the same function can be realized by use of an analog integration circuit and delay circuit.

FIG. 8 is a circuit diagram showing an example of the construction of the delay latch group 4 and effective pulse width detection circuit 6 in the circuit shown in FIG. 2. The delay latch group 4 includes an inverter IB31 and D-type flip-flop circuits DF1 to DFB and the effective pulse width detection circuit 6 includes NAND gates ND2 to ND7 and inverters IB32, IB33.

The output terminal of the inverter IB2 in the analog delay circuit 2 shown in FIG. 3 is connected to the data input terminal D of the D-type flip-flop DF1, and the data output terminal Q of the D-type flip-flop DF1 is connected to the data input terminal D of the next-stage D-type flip-flop DF2. Likewise, each of the data output terminals Q of the D-type flip-flops DF2 to DF7 is connected to a corresponding one of the data input terminals D of the next-stage D-type flip-flops DF3 to DF8. The reset signal RESET is supplied to the input terminal of the inverter IB31. The output terminal of the inverter IB31 is connected to the reset terminals of the D-type flip-flops DF1 to DF8. Further, a clock signal CK is supplied to the clock input terminals CK of the D-type flop-flop circuits DF1 to DF8. Thus, a shift register for sequentially shifting the reset signal RESET in response to the clock signal CK is constructed.

The data output terminal Q of the D-type flip-flop DF1 is connected to the first input terminal of the NAND gate ND2 and the data output terminal Q of the D-type flip-flop DF2 is connected to the second input terminal of the NAND gate ND2. The data output terminal Q of the D-type flip-flop DF3 is connected to the first input terminal of the NAND gate ND3 and the data output terminal Q of the D-type flip-flop DF4 is connected to the second input terminal of the NAND gate ND3. The data output terminal Q of the D-type flip-flop DF5 is connected to the first input terminal of the NAND gate ND4, the data output terminal Q of the D-type flip-flop DF6 is connected to the second input terminal of the NAND gate ND4, the data output terminal Q of the D-type flip-flop DF7 is connected to the third input terminal of the NAND gate ND4 and the data output terminal Q of the D-type flip-flop DF8 is connected to the fourth input terminal of the NAND gate ND4.

The output terminal of the NAND gate ND2 is connected to the first input terminal of the NAND gate ND5 via the inverter IB32, and the output terminal of the NAND gate ND3 is connected to the first input terminal of the NAND gate ND6. The second input terminal of the NAND gate ND6 is supplied with a changeover signal SE4 for changing the effective pulse width of the reset signal RESET which specifies the reset operation. The output terminal of the NAND gate ND4 is connected to the first input terminal of the NAND gate ND7 and the second input terminal of the NAND gate ND7 is supplied with a changeover signal SE8 for changing the effective pulse width of the reset signal RESET which specifies the reset operation. Further, the output terminal of the NAND gate ND6 is connected to the second input terminal of the NAND gate ND5 and the output terminal of the NAND gate ND7 is connected to the third input terminal of the NAND gate ND5. The output terminal of the NAND gate ND5 is connected to the input terminal of the waveform forming circuit 8 via the inverter IB33.

Figures 9, 10:
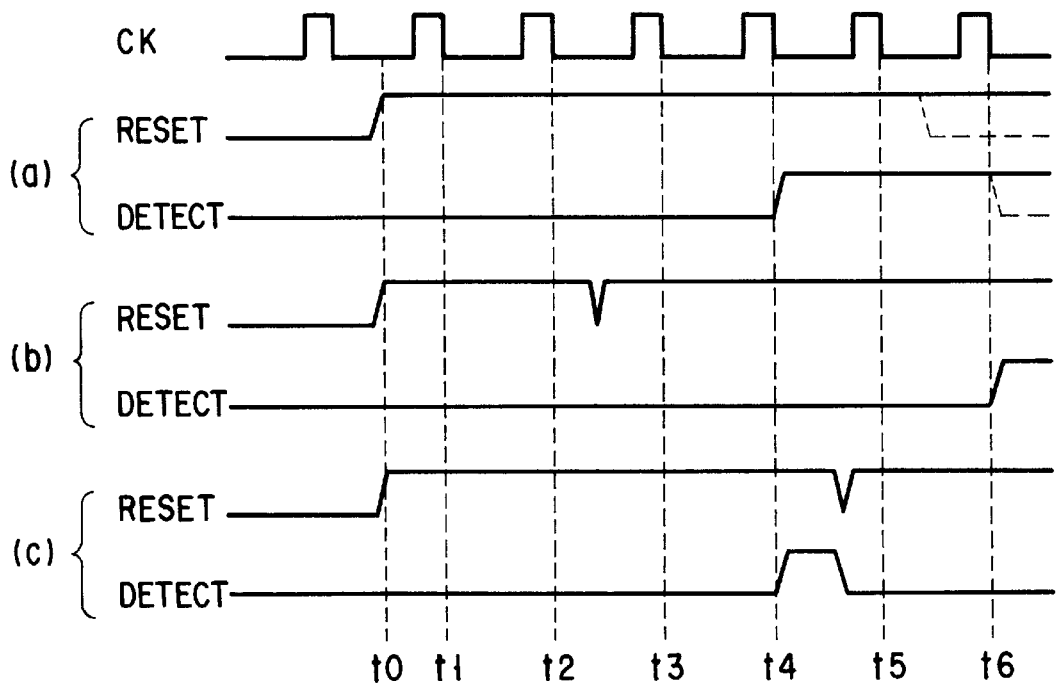
FIG. 9 is a diagram showing the relation between a detected width and a changeover signal for changing the effective pulse width of the effective pulse width detection circuit in the circuit of FIG. 8.
FIG. 10 is a timing chart for illustrating the operations of the effective pulse width detection circuit and delay latch group in the circuit of FIG. 8.

The delay latch group 4 and effective pulse detection circuit 6 constructed as shown in FIG. 8 effect the following circuit operations. First, changeover of the effective pulse widths in the reset signal RESET is explained. In the above circuit, the pulse width of a specifying signal for causing the reset circuit 12 to effect the reset operation can be changed and detected. In order to change the effective pulse width of the specifying signal, the signals SE4, SE8 are set as shown in FIG. 9. That is, if both of the signals SE4 and SE8 are set at the "L" level, the detection width of the effective pulse width can be set to "2", if the signal SE4 is set at the "H" level and the signal SE8 is set at the "L" level, the detection width can be set to "4", and if both of the signals SE4 and SE8 are set at the "H" level, the detection width can be set to "8".

The detection width represents the number of pulses of the clock signal CK, if the detection width is "2", the presence of an effective pulse signal for specifying the reset operation is determined when the pulse width thereof is equal to or longer than a period in which two pulses of the clock signal are input. Likewise, if the detection width is "4" or "8", the presence of an effective pulse signal for specifying the reset operation is determined when the pulse width thereof is equal to or longer than a period in which four or eight pulses of the clock signal are input.

Next, the circuit operation effected when the detection width is set to "4" is explained. FIG. 10 is a timing chart for illustrating the circuit operations of the delay latch group 4 and effective pulse detection circuit 6. As shown in (a) of FIG. 10, if the reset signal RESET rises to the "H" level (time t0) and is kept at the "H" level for a period (t1 to t4) in which four pulses of the clock signal CK are input, the "H" levels are held in the D-type flip-flops DF1 to DF4 and the "H" levels are output from the respective data output terminals Q. As a result, a detection signal DETECT output from the inverter IB33 rises to the "H" level (time t4). After this, when the reset signal RESET falls to the "L" level as shown by the broken lines, the detection signal DETECT falls to the "L" level when the first pulse of the clock signal CK falls (time t6) after the fall of the reset signal.

Further, as shown in (b), if the reset signal RESET rises to the "H" level (time t0), two pulses of the clock signal are input, and if the reset signal RESET temporality falls by a noise before the third pulse is input (between times t2 and t3), then the "H" levels held in the D-type flip-flops DF1, DF2 are reset. As a result, detection of the two pulses before the noise is input is cleared, and if the reset signal RESET maintains the "H" level for a period in which four pulses of the clock signal CK are input after the reset signal RESET rises to the "H" level as shown in (a), the detection signal DETECT rises to the "H" level.

Further, as shown in (c), if the reset signal RESET rises to the "H" level (time t0) and is kept at the "H" level for a period (t1 to t4) in which four pulses of the clock signal CK are input, the detection signal DETECT rises to the "H" level. After this, if the reset signal RESET temporality falls by a noise before the fifth pulse of the clock signal CK is input (between times t4 and t5), then the "H" levels held in the D-type flip-flops DF1 to DF4 are reset. As a result, the detection signal DETECT output from the inverter IB33 immediately falls to the "L" level.

Likewise, in a case where the detection width is set to "2" by use of the changeover signals SE4, SE8, the detection signal DETECT is output from the inverter IB33 if the reset signal RESET maintains the "H" level for a period in which two pulses of the clock signal CK are input. Also, in a case where the detection width is set to "8" by use of the changeover signals SE4, SE8, the detection signal DETECT is output from the inverter IB33 if the reset signal RESET maintains the "H" level for a period in which eight pulses of the clock signal CK are input.

FIG. 11 is a circuit diagram showing an example of the construction of the waveform forming circuit in the circuit shown in FIG. 2. The waveform forming circuit 8 forms a signal of pulse waveform (pulse width) which is kept at the "H" level for a period in which four pulses of the clock signal CK2 are input. As shown in 11, the waveform forming circuit 8 includes D-type flip-flops DF11 to DF14 and NAND gate ND8. The data input terminal D of the D-type flip-flop DF11 is connected to the power supply V and supplied with data of "H" level. The data output terminal Q of the D-type flip-flop DF11 is connected to the data input terminal D of the next-stage D-type flip-flop DF12. The data output terminal Q of the D-type flip-flop DF12 is connected to the data input terminal D of the next-stage D-type flip-flop DF13. The data output terminal Q of the D-type flip-flop DF13 is connected to the data input terminal D of the next-stage D-type flip-flop DF14. The detection signal DETECT output from the effective pulse width detection circuit 6 is input to the reset terminals R of the flip-flops DF11 to DF14 and the clock signal CK2 is input to the clock terminals CK of the flip-flops DF11 to DF14.

The data output terminal Q of the D-type flip-flop DF11 is connected to the first input terminal of the NAND gate ND8 and the data output terminal Q of the D-type flip-flop DF12 is connected to the second input terminal of the NAND gate ND8. Further, the data output terminal Q of the D-type flip-flop DF13 is connected to the third input terminal of the NAND gate ND8 and the data output terminal Q of the D-type flip-flop DF14 is connected to the fourth input terminal of the NAND gate ND8. Then, an internal reset signal RESET is output from the output terminal of the NAND gate ND8 to the reset circuit 12.

FIG. 12 is a timing chart for illustrating the circuit operation of the waveform forming circuit 8. First, in a period in which the detection signal DETECT is set at the "L" level before it rises to the "H" level (before time t0), signals of "H" level are output from the data output terminals Q of the flip-flops DF11 to DF14. Therefore, signals input to the first to fourth input terminals of the NAND gate ND8 are all set to the "H" level and the internal reset signal RESET output from the NAND gate ND8 is set to the "L" level.

Next, when the detection signal DETECT rises to the "H" level (time t0), signals of "H" level are input to the reset terminals R of the flip-flops DF11 to DF14. Therefore, the "H" levels held in the flip-flops DF11 to DF14 are reset and signals of "L" level are output from the data output terminals Q of the flip-flops. As a result, signals input to the first to fourth input terminals of the NAND gate ND8 are all set to the "L" level and the internal reset signal RESET output from the NAND gate ND8 is set to the "H" level.

Next, when the detection signal DETECT falls from the "H" level to the "L" level (time t1), signals of "L" level are input to the reset terminals R of the flip-flops DF11 to DF14. Therefore, the reset states of the flip-flops DF11 to DF14 are released, and when a first pulse of the clock signal CK2 is input, a signal of "H" level is output from the data output terminal Q of the flip-flop DF11. Further, when a second pulse of the clock signal is input, signals of "H" level are output from the data output terminals Q of the flip-flops DF11, DF12. Likewise, when a third pulse of the clock signal is input, signals of "H" level are output from the data output terminals Q of the flip-flops DF11 to DF13, and when a fourth pulse of the clock signal is input, signals of "H" level are output from the data output terminals Q of all of the flip-flops DF11 to DF14.

Thus, each time the pulse of the clock signal CK2 is input, the number of the signals of "H" level input to the first to fourth input terminals of the NAND gate ND8 increases, and when the fourth pulse is input, all of the signals input to the first to fourth input terminals of the NAND gate ND8 are set to the "H" level and the internal reset signal RESET output from the NAND gate ND8 is set to the "L" level (time t2). Therefore, the internal reset signal RESET is held at the "H" level until the fourth pulse of the clock signal CK2 is input after the detection signal DETECT falls from the "H" level to the "L" level and thus a signal of a pulse width necessary for the reset operation which is previously set in the reset circuit 12 can be formed.

In the above explanation, the pulse width necessary for the reset operation of the MCU 10 by the reset circuit 12 is explained as a pulse waveform for holding the "H" level for a period in which the four pulses of the clock signal CK2 are input, but the period of "H" level can be set to a period corresponding to the number of pulses other than four pulses according to the pulse width necessary for the reset operation of the MCU 10. In this case, the number of cascade-connected D-type flip-flops in the circuit of FIG. 11 may be increased or decreased according to the number of pulses. Further, the pulse width of the internal reset signal RESET can be changed by changing the frequency of the clock signal CK2.

According to the above-described embodiment, an impulsive noise applied to the reset terminal RES can be effectively eliminated. Further, since the effective pulse width of the reset signal for specifying the reset operation can be freely set, a signal (noise) of a period shorter than the set pulse width is eliminated, a signal of a period equal to or longer than the effective pulse width is detected and a reset signal of a pulse width necessary for system reset by the reset circuit 12 is formed so that a stable reset signal RESET containing less noise can be supplied to the reset circuit 12. As a result, the reset circuit 12 may be made free from the influence by the impulsive noise, noise from the actuator and EMS noise and can stably prevent the erroneous operation and runaway of the MCU 10.

In the above embodiment, a case wherein the reset signal supplied to the reset circuit for initializing the operation of the MCU is taken as an example is explained, but the above-described circuit may be added not only to the reset terminal but also to the other terminal such as the test terminal, mode switching terminal or interruption terminal to eliminate the noise, form a signal of an optimum pulse width and stably control the operation of the MCU.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device comprising:
   noise filter means for eliminating a noise with a pulse width shorter than an effective pulse width from an input signal;
   sampling means for sequentially sampling an output signal of said noise filter means;
   effective pulse width detection means for receiving an output signal of said sampling means and determining whether or not the input signal has an effective pulse width, wherein said effective pulse width detection means determines whether or not the pulse width of the input signal sampled by said sampling means reaches a preset number of pulses of a clock signal and outputs a detection signal when it is detected that the preset number of pulses is reached; and
   waveform forming means for receiving an output signal of said effective pulse width detection means and forming an internal signal with a necessary pulse width based on the input signal when it is detected that the input signal has the effective pulse width.

2. A semiconductor integrated circuit device according to claim 1, wherein said noise filter means includes an analog delay circuit and eliminates a variation in the input signal which is shorter than the delay time of said analog delay circuit as a noise.

3. A semiconductor integrated circuit device according to claim 1, wherein said noise filter means includes an analog integrating circuit means.

4. A semiconductor integrated circuit device according to claim 1, wherein said noise filter means includes a CR filter circuit.

5. A semiconductor integrated circuit device according to claim 2, wherein the pulse width of a noise to be eliminated is changed by changing the delay time of said analog delay circuit.

6. A semiconductor integrated circuit device according to claim 2, wherein said analog delay circuit includes a Schmitt trigger circuit supplied with the input signal at an input terminal thereof; a delay circuit for delaying an output signal of said Schmitt trigger circuit; and a logic circuit for deriving a logical AND of the output signal of said Schmitt trigger circuit and an output signal of said delay circuit and an output signal of said logic circuit is supplied to said sampling means.

7. A semiconductor integrated circuit device according to claim 2, wherein said analog delay circuit includes first and second Schmitt trigger circuits;

a plurality of resistors;

a plurality of inverters; and a plurality of capacitors;

the input signal is supplied to an input terminal of said first Schmitt trigger circuit, said plurality of resistors and said plurality of inverters are alternately cascade-connected between the output terminal of said first Schmitt trigger circuit and an input terminal of said second Schmitt trigger circuit, said plurality of capacitors are respectively connected between one-side ends of said plurality of resistors and a reference potential node, and an output signal of said second Schmitt trigger circuit is supplied to said sampling means.

8. A semiconductor integrated circuit device according to claim 2, wherein said analog delay circuit includes a Schmitt trigger circuit supplied with the input signal at an input terminal thereof;

a plurality of inverters cascade-connected to an output terminal of said Schmitt trigger circuit;

a plurality of capacitors connected between output terminals of said inverters and a reference potential node;

a plurality of clocked inverters whose input terminals are selectively connected to the output terminals of said inverters;

a register for storing data corresponding to a noise elimination period and supplying a selection signal to clock input terminals of said clocked inverters;

a first MOS transistor of a first conductivity type in which one end of the current path is connected to a first power supply and a gate is connected to the output terminal of said Schmitt trigger circuit;

a second MOS transistor of the first conductivity type in which one end of the current path is connected to the other end of the current path of said first MOS transistor and a gate is connected to output terminals of said plurality of clocked inverters;

a third MOS transistor of a second conductivity type in which one end of the current path is connected to a second power supply and a gate is connected to the output terminal of said Schmitt trigger circuit;

a fourth MOS transistor of the second conductivity type in which one end of the current path is connected between the other end of the current path of said third MOS transistor and the other end of the current path of said second MOS transistor and a gate is connected to the output terminals of said plurality of clocked inverters;

a latch circuit for latching a potential of a connection node of the current paths of said second and fourth MOS transistors; and an inverter having an input terminal connected to the connection node of the current paths of said second and fourth MOS transistors and an output terminal connected to the input terminal of said sampling means.

9. A semiconductor integrated circuit device according to claim 1, wherein said sampling means includes a delay latch group for delaying an output signal of said noise filter means.

10. A semiconductor integrated circuit device according to claim 9, wherein said delay latch group includes a shift register which is supplied with the output signal of said noise filter means, sequentially transfers the signal in response to the clock signal and is reset by an inverted signal of the output signal of said noise filter means.

11. A semiconductor integrated circuit device according to claim 10, wherein said shift register is reset by a noise of a period shorter than the effective pulse width, wherein the noise occurs during the sampling period.

12. A semiconductor integrated circuit device according to claim 10, wherein said shift register includes a plurality of D-type flip-flops in which data output terminals and data input terminals are cascade-connected, the output signal of said noise filter means is input to an input terminal of a first-stage of said plurality of D-type flip-flops, a signal is sequentially transferred to a next-stage of said plurality of D-type flip-flops in response to the clock signal, and an inverted signal of the output signal of said noise filter means is input to the reset terminals of said D-type flip-flops.

13. A semiconductor integrated circuit device according to claim 1, wherein said effective pulse width detection means includes a NAND gate selectively supplied with the output signal of said sampling means and an inverter for inverting said NAND gate.

14. A semiconductor integrated circuit device according to claim 1, wherein the effective pulse width detected by said effective pulse width detection means is selectively set from a plurality of effective pulse widths corresponding to predetermined pulse width.

15. A semiconductor integrated circuit device according to claim 12, wherein said effective pulse width detection means includes a plurality of first NAND gates which input terminals are selectively connected to output terminals of said plurality of D-type flip-flops; first inverter for inverting at least one of said plurality of first NAND gates; a second NAND gate which one input terminal applied with an output signal of one of said plurality of first NAND gates and the other input terminals applied with selection signals; third NAND gate which applied with an output signal of said first inverter and an output signal of said second NAND gate; and second inverter for inverting to an output signal of said third NAND gate and outputting a detection signal.

16. A semiconductor integrated circuit device according to claim 1, wherein said waveform forming means includes a plurality of cascade-connected D-type flip-flops; and a NAND gate supplied with output signals of said plurality of D-type flip-flops;

an input terminal of a first-stage D-type flip-flop of said plurality of D-type flip-flops is applied with a potential of "H" level and a reset terminal of said first-stage D-type flip-flop is supplied with a detection signal of said effective pulse width detection means.

17. A semiconductor integrated circuit device according to claim 1, further comprising an MCU (micro controller unit); and a reset circuit for initializing said MCU; wherein the input signal is a reset signal, and an internal signal output from said waveform forming means is supplied to said reset circuit.

* * * * *